Patented Mar. 16, 1948

2,437,964

UNITED STATES PATENT OFFICE 2,437,964

FINISH REMOVER COMPOSITION

Paul E. Marling, Dayton, Ohio, assignor to Monsanto Chemical Company, St. Louis, Mo., a corporation of Delaware No Drawing. Application December 1, 1944,
Serial No. 566,245

8 Claims. (Cl. 252—140)

The present invention relates to paint and varnish removing compositions comprising diethyl phosphite and to methods of producing the same.

The object of the invention is to provide a finish remover suitable for general purposes which is non-volatile and non-flammable, and without deleterious action on wood or metal surfaces.

I have found that diethyl phosphite and compositions comprising diethyl phosphite, either in the presence or absence of a bodying or thickening agent, adapted to increase the viscosity thereof, are eminently suited for removing dried films of paint, varnish, lacquer, etc. My compositions present little or no fire hazard, leave no greasy coating on the cleaned object, and are capable of softening and removing old paint and varnish films in a time varying from a few minutes to an hour. Because of the non-flammable nature of the composition, it may be applied either cold or hot.

Diethyl phosphite may be prepared by the following reaction:

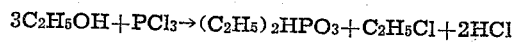

The following method of preparation has been found satisfactory:

3.3 mols of absolute alcohol are cooled and 1 mol of $PCl_3$ is added while keeping the temperature under 20° C. Good stirring and cooling are necessary. The HCl, ethyl chloride and excess alcohol are stripped off as soon as the reaction is complete; appreciable delays between completion of reaction and distillation cause lower yields. The diethyl phosphite is then distilled out at the lowest vacuum available.

Diethyl phosphite is a liquid, B. P. 92° C./30 mm., which is stable under ordinary atmospheric conditions and which is completely miscible with water and with most organic solvents. It is a good solvent for many of the known synthetic resins; for example, polystyrene, the polyvinyl acetals, cellulose esters, etc. Unlike the previously employed constituents of finish removing compositions, e. g., benzene, acetone, etc., diethyl phosphite is substantially non-flammable and non-volatile. It may thus be allowed to remain on the treated objects for long periods of time if desired without risk of fire and evaporation of the finish remover.

Because diethyl phosphite is a liquid of low viscosity, when employing it as a finish remover, it is advantageous to incorporate it with, say, from 1% to 10% by weight of a thickening or bodying material. As thickening agents may be employed natural and artificial waxes, for example, paraffin wax, ceresin, candelilla wax, N,N'-distearoyldiaminomethane (a synthetic wax), cellulose esters, or mixtures of these bodying materials may be used. There may also be employed as thickening agents various synthetic or natural resins which are soluble or miscible with the diethyl phosphite, for example, polyvinyl formal, polyvinyl butyral, polystyrene, cellulose acetate, cellulose triacetate, cellulose nitrate, etc. The thickening agent is instrumental in maintaining a temporary coating of the diethyl phosphite upon the finish which is to be removed, but in itself it has no apparent effect upon the finish. In some cases, for example, when working rapidly with a sponge or cloth which has been soaked with diethyl phosphite, a thickening agent need not be employed. A thickening agent also need not be employed when the diethyl phosphite is employed for removing old paint and varnish that has collected in paint or varnish brushes. Here it is sufficient to merely immerse the brush in diethyl phosphite for several hours and then to wash away the softened film by rinsing with water.

The invention is further illustrated, but not limited, by the following examples:

Example 1

To 50 g. of diethyl phosphite there was added, with stirring, 1.5 g. of cellulose acetate. The cellulose acetate dissolved in the diethyl phosphite in the cold. The resulting solution was applied to an old varnish film. Within a time of from 3 to 4 minutes the treated film had softened and blistered, and within a time of 10 minutes it could readily be removed by peeling off or by scraping. The wood panels from which varnish had been removed in this manner were neither greasy or discolored by the treatment.

Example 2

A mixture consisting of 50 g. of diethyl phosphite and 2.5 g. of nitrocellulose (0.5 sec.), which had been prepared by adding the nitrocellulose to the phosphite in the cold, was applied to a panel which was coated with an old varnish film. After 3 minutes there was pronounced blistering of the film and after 10 minutes the film was readily removed by scraping. That the diethyl phosphite-nitrocellulose solution is substantially unvolatile under the working conditions was shown by the fact that after the solution had been allowed to remain on the coated film for a time of 24 hours, the film was still wet.

Example 3

2.0 g. of paraffin wax was added to 50 g. of diethyl phosphite at a temperature of from 70° C. to 90° C. When the resulting cooled, somewhat opaque, mixture was applied to a varnish-coated panel, there was pronounced blistering of the varnish film within a time of 2 minutes, and the film could readily be removed from the panel within a time of 10 minutes. A varnished panel coated with the mixture prepared in this example remained wet for a time of 24 hours.

Example 4

A solution of 1.5 g. of cellulose acetate in 50 g. of diethyl phosphite was applied, by brushing, to a dried, white-painted panel. Within a time of from 2 to 3 minutes the paint had become blistered, and within a time of 10 minutes it was readily removed from the panel by scraping.

Example 5

Diethyl phosphite, containing 2.5% of paraffin wax, 3.0% of nitrocellulose and 2.5% cellulose acetate, based on the weight of the diethyl phosphite, was brushed on to a panel which had been coated with varnish. After 10 minutes, the varnish film was substantially free of the wood and could be readily removed therefrom by peeling or scraping. A varnished panel coated with the mixture remained wet after a period of 24 hours. The proportions of the composition may be varied over wide limits.

Example 6

Diethyl phosphite, containing 1.4% paraffin wax and 3.6% cellulose acetate, based on the weight of the diethyl phosphite, was applied to a dried, varnished wooden panel. At the end of 10 minutes the varnish film had become softened and no longer adhered to the wood. The proportions of the wax and cellulose acetate may be varied over wide limits, as can also the proportions thereof with diethyl phosphite.

Example 7

A paint brush which had become hard by accumulation of dried paint was immersed in diethyl phosphite and allowed to remain there for a time of from 3 to 4 hours at room temperature. At the end of that time the bristles had softened and it was found possible to remove the paint fragments by washing with tap water.

The fact that no volatile solvents such as benzol or gasoline need be employed in cleaning the surfaces from which the paint or varnish has been removed by means of my new finish remover is extremely important from a practical standpoint. This is possible because the diethyl phosphite, itself, is miscible with water in all proportions and because none or only comparatively small amounts of thickening agents need be employed. The thickening agent, being present in a substantially dissolved state and in only very small quantities in the diethyl phosphite is readily removed when the phosphite is washed away with water.

While the above examples show the removal of only varnish and paint films, the present diethyl phosphite finish removing composition is also advantageously employed in removing other hard, dried films, for example, films produced from lacquers, paints of the water-in-oil emulsion type, etc. My new finish removing composition is of high reactivity, attacking films of coating in a time of only two or three minutes. At the same time, it shows little or no reactivity for organic materials in general and is substantially non-corrosive and non-toxic. In this respect it differs essentially from prior finish removing compositions, e. g., those containing caustics or phenols or chlorinated compounds such as carbon tetrachloride or chlorobutene. Thus the diethyl phosphite finish-removing compositions are to be preferred over prior known finish-removing compositions in that the phosphite compositions are substantially non-corrosive and non-toxic. Also, the present compositions are neither flammable or readily volatilized.

What I claim is:

1. A fluent finish remover suitable for removing paints, enamels, varnishes and lacquers comprising diethyl phosphite combined with a thickening agent miscible therewith, the proportion of said thickening agent being from 1% to 10% by weight of the weight of said phosphite.

2. A fluent finish remover suitable for removing paints, enamels, varnishes and lacquers comprising diethyl phosphite combined with a cellulose ester miscible therewith, the proportion of said cellulose ester being from 1% to 10% by weight of the weight of said phosphite.

3. A fluent finish remover suitable for removing paints, enamels, varnishes and lacquers comprising diethyl phosphite combined with cellulose acetate, the proportion of said cellulose acetate being from 1% to 10% by weight of the weight of said phosphite.

4. A fluent finish remover suitable for removing paints, enamels, varnishes and lacquers comprising diethyl phosphite combined with paraffin wax, the proportion of said wax being from 1% to 10% by weight of said phosphite.

5. A fluent finish remover suitable for removing paints, enamels, varnishes and lacquers consisting of diethyl phosphite and cellulose nitrate, the amount of said nitrate being about 5% by weight of said diethyl phosphite.

6. A fluent finish remover suitable for removing paints, enamels, varnishes and lacquers consisting of diethyl phosphite and paraffin wax, the amount of said paraffin wax being about 4% by weight of said diethyl phosphite.

7. A fluent finish remover suitable for removing paints, enamels, varnishes and lacquers comprising diethyl phosphite containing 2.5% of paraffin wax, 3.0% of nitrocellulose and 2.5% of cellulose acetate based on the weight of said diethyl phosphite.

8. A fluent finish remover suitable for removing paints, enamels, varnishes and lacquers comprising diethyl phosphite containing 1.4% of paraffin wax and 3.6% of cellulose acetate based on the weight of said diethyl phosphite.

PAUL E. MARLING.

REFERENCES CITED

The following references are of record in the file of this patent:

UNITED STATES PATENTS

| Number | Name | Date |
| --- | --- | --- |
| 1,014,211 | Dosselman et al. | Jan. 9, 1912 |
| 1,613,561 | Ellis | Jan. 4, 1927 |
| 2,224,695 | Prutton | Dec. 10, 1940 |
| 2,299,096 | Krieger | Oct. 20, 1942 |

OTHER REFERENCES

Chemical Formulary, Bennett; vol. 4 (1939), page 13.